Patented Dec. 31, 1946

2,413,631

UNITED STATES PATENT OFFICE 2,413,631

WHITENING EGGS

James D. Ingle, Chicago, Ill., assignor to Industrial Patents Corporation, Chicago, Ill., a corporation of Delaware No Drawing. Application September 6, 1940, Serial No. 355,667

20 Claims. (Cl. 99—230)

This invention relates to the treatment of shell eggs and has to do particularly with a method of improving the color of egg shells. The color of egg shells in many cases affects the marketability of the eggs. Many consumers prefer white shell eggs to buff, although the color of the shell does not affect the quality of the egg material.

The principal object of this invention is to provide a method of whitening buff colored egg shells without affecting the egg material.

The present invention contemplates treatment of colored shell eggs with an oxidizing agent whereby the color of the egg shell is substantially improved.

It has been found that oxidizing agents remove from the egg shell the bloom which is a protein material containing the color. The oxidizing agent causes a disintegration and removal of the bloom.

Any suitable oxidizing agent may be used, including acid or alkaline oxidizing agents, although I prefer to use acid oxidizing agents. Examples of acid oxidizing agents are: nitric acid, aqua, regia, chromic acid, chromates plus mineral acids, chloric acid, perchloric acid, chlorine plus water, bromine plus water, manganese dioxide plus sulphuric acid, lead dioxide plus sulphuric acid, lead tetra acetate plus acetic acid, per-organic acids (as perbenzoic), formaldehyde peroxide, and hydrogen peroxide in acid.

Alkaline oxidizing agents which are contemplated include: hydrogen peroxide or other peroxides in alkalies, alkaline potassium permanganate, chromates, Fehling solution, ammoniacal silver nitrate, Schweitzer's reagent, and perborates.

The oxidizing agent is preferably used in a fluid or liquid form in order to facilitate proper contact with the egg shell. Aqueous solutions are preferred although other solvents in which the oxidizing agent is soluble may be employed. An aqueous acid solution of the oxidizing agent has been found to give excellent results.

In practicing the invention, the eggs are subjected to the action of a solution of the oxidizing agent and are than washed while the surface is brushed lightly. The brushing operation may be eliminated by treating the eggs with an acid or alkali neutralizing solution after the treatment.

The solution of the oxidizing agent may be improved by the addition of a small amount of a wetting agent, for example, the sulphonated aromatic naphthalene product known on the market as Nacconol NR. Any wetting agent which is not destroyed or whose usefulness is not impaired by the presence of a strong acid is satisfactory for use. Other examples of wetting agents are sulphated higher alcohols, such as the commercial product Duponol, alkylated aryl sulphonates, such as the commercial product Santomerse, sulphated esters of higher alcohols and dibasic acids, such as the commercial product Aerosol, and the like.

In preparing the whitening solution, I have found that any of the common alkalis or inorganic acids may be used for preparing the acid or alkaline oxidizing agents as the case may be. I prefer concentrations ranging from 5 per cent to 60 per cent as the liquid medium. Examples of inorganic acids which are satisfactory for the purposes of my invention are hydrochloric acid, nitric acid, and sulphuric acid. Suitable alkalis include ammonia, aqueous solutions of ammonia, sodium hydroxide, and potassium hydroxide.

The amount of oxidizing agent is not cricital but in practice I prefer to use a solution containing from 5 per cent to 40 per cent oxidizing agent. The most satisfactory oxidizing agents are solutions of nitric acid, aqua regia and the dichromates, for example, potassium dichromate and sodium dichromate.

I have found that a solution containing 20 per cent sodium dichromate, 40 per cent concentrated hydrochloric acid, and 40 per cent water, and containing a small amount of a wetting agent produces a very satisfactory solution for the purposes of my invention.

As an example of the operation of my invention, the eggs are immersed in the solution for a period of about five seconds to ten seconds and then washed while brushing lightly. After the eggs have been immersed in the solution, they may be immersed in or subjected to the action of a 5 per cent alkali solution and then washed without brushing. Buff colored shell eggs treated in accordance with this invention are changed to a white color comparable to that of the usual white color of egg shells.

The treatment does not affect the quality of the egg material or the usual shrinkage of eggs during storage periods.

This application is a continuation in part of my application, Serial No. 262,288, which was filed March 16, 1939.

Obviously many modifications and variations of the invention hereinbefore set forth may be made without departing from the spirit and scope thereof, and therefore only such limitations

I claim:

1. In a method of treating buff colored shell eggs, the step of disintegrating and removing bloom by immersing the eggs in an aqueous solution containing from 5 per cent to 60 per cent of an inorganic acid, from 5 per cent to 40 per cent of an oxidizing agent, and a small amount of a wetting agent.

2. In a method of treating buff colored shell eggs, the step which comprises disintegrating and removing the bloom of the shell by immersing the eggs in a solution containing hydrochloric acid, a dichromate, and a small amount of a wetting agent.

3. In a method of treating buff colored shell eggs, the step which comprises removing and disintegrating the bloom of the shell by immersing the eggs in an aqueous solution containing 20 per cent sodium dichromate, 40 per cent hydrochloric acid, and a small amount of a wetting agent.

4. In a method of treating buff colored shell eggs, the step which comprises disintegrating and removing the bloom of the shell by immersing the eggs in an aqueous solution containing nitric acid and a dichromate.

5. In a method of treating buff colored shell eggs, the step which comprises disintegrating and removing the bloom of the shell by immersing the eggs in an aqueous solution containing sulphuric acid and a dichromate.

6. The method of whitening buff colored shell eggs which comprises disintegrating and removing the bloom of the shell by immersing the eggs in an aqueous solution containing an inorganic acid and a dichromate and thereafter washing the solution from the surface of the eggs.

7. The method of whitening buff colored shell eggs which comprises disintegrating and removing the bloom of the shell by immersing the eggs in an aqueous solution containing an inorganic acid and a dichromate and thereafter immersing the eggs in a dilute alkaline solution.

8. The method of whitening buff colored shell eggs which comprises disintegrating and removing the bloom of the shell by immersing the eggs for a period of from five to ten seconds in an aqueous solution containing 40 per cent hydrochloric acid, 20 per cent sodium dichromate, and a small amount of a wetting agent and thereafter removing the solution from the surface of the eggs.

9. The method of whitening buff colored shell eggs which comprises disintegrating and removing the bloom of the shell by immersing the eggs for a period of from five to ten seconds in an aqueous solution containing 40 per cent hydrochloric acid, 20 per cent sodium dichromate, and a small amount of a wetting agent and thereafter washing the eggs while brushing the surfaces.

10. The method of whitening buff colored shell eggs which comprises disintegrating and removing the bloom of the shell by immersing the eggs for a period of from five to ten seconds in an aqueous solution containing 40 per cent hydrochloric acid, 20 per cent sodium dichromate, and a small amount of a wetting agent and thereafter immersing the eggs in a dilute solution of an alkali.

11. In a method of treating buff colored shell eggs, the step which comprises disintegrating and removing the bloom of the shell by immersing the eggs in an aqueous solution containing an inorganic acid and a dichromate.

12. In a method of treating buff colored shell eggs, the step which comprises disintegrating and removing the bloom of the shell by immersing the eggs in an aqueous solution containing an inorganic acid, a dichromate, and a small amount of a wetting agent.

13. The method of whitening naturally colored shell eggs which comprises disintegrating and removing the bloom of the shell by treating the shell with a solution containing an oxidizing agent.

14. The method of treating naturally colored shell eggs to improve the color which comprises the step of disintegrating and removing the bloom by treating the shell with a solution containing an acid oxidizing agent.

15. A method according to claim 14 in which the oxidizing agent is nitric acid.

16. In a method of treating naturally colored shell eggs, the step which comprises disintegrating and removing the bloom of the shell by subjecting the shell to the action of a whitening solution, the whitening solution comprising an alkaline oxidizing agent.

17. A method according to claim 16 in which the alkaline oxidizing agent is alkaline potassium permanganate.

18. In a method of treating buff colored shell eggs, the step of disintegrating and removing the bloom which comprises subjecting the shells to the action of an acid and an oxidizing agent.

19. In a method of treating buff colored shell eggs, the step of disintegrating and removing the bloom which comprises subjecting the shells to the action of an acid solution containing an oxidizing agent.

20. In a method of treating buff colored shell eggs, the step of disintegrating and removing the bloom which comprises immersing the eggs in a solution containing an inorganic acid and an oxidizing agent.

JAMES D. INGLE.